(12) United States Patent
Sun

(10) Patent No.: US 6,527,955 B1
(45) Date of Patent: Mar. 4, 2003

(54) HEAT-ACTIVATABLE MICROPOROUS MEMBRANE AND ITS USES IN BATTERIES

(75) Inventor: Luying Sun, Randolph, NJ (US)

(73) Assignee: Policell Technologies, Inc., Newark, NJ (US)

( * ) Notice: Subject to any disclaimer, the term of this patent is extended or adjusted under 35 U.S.C. 154(b) by 0 days.

(21) Appl. No.: 10/034,494

(22) Filed: Dec. 28, 2001

(51) Int. Cl.[7] .................. B10D 39/00; B10D 39/14; B10D 24/00
(52) U.S. Cl. .............. 210/500.22; 210/500.1; 210/500.21; 210/500.26; 210/500.27; 210/500.34; 210/500.35; 210/500.4; 210/500.41; 429/247; 429/249; 429/250; 429/251; 429/252; 429/253; 429/254
(58) Field of Search .................. 210/650, 500.1, 210/500.27, 500.34, 500.35, 500.4, 500.41, 500.42, 500.43; 428/41.5, 41.7, 41.3, 41.9, 65.9, 65.2, 65.3; 429/249, 247, 250–254, 142, 145, 144; 523/177, 200; 106/122

(56) References Cited

U.S. PATENT DOCUMENTS

| | | | | |
|---|---|---|---|---|
| 4,197,148 A | | 4/1980 | Shinomura | |
| 5,123,900 A | * | 6/1992 | Wick | |
| 5,618,265 A | * | 4/1997 | Myers et al. | .......... 604/20 |
| 5,712,038 A | * | 1/1998 | Yamazaki | |
| 6,177,187 B1 | * | 1/2001 | Niemoller | |
| 6,270,928 B1 | * | 8/2001 | Andrieu | |
| 2001/0024756 A1 | | 9/2001 | Yamasaki | |

* cited by examiner

Primary Examiner—W. L. Walker
Assistant Examiner—K S Menon
(74) Attorney, Agent, or Firm—Mathews, Collins, Shepherd & McKay, P.A.

(57) ABSTRACT

A novel microporous membrane comprising a hot-melt adhesive and an engineering plastics, the methods of preparing such microporous membrane and the uses of the microporous membrane in, e.g., batteries, super capacitors, fuel cells, sensors, electrochromic devices or the like.

19 Claims, 2 Drawing Sheets

HEAT-ACTIVATABLE MICROPOROUS MEMBRANE AND ITS USES IN BATTERIES

FIELD OF THE INVENTION

The present invention relates generally to a microporous membrane, methods of making the microporous membrane and, in particular, to the use of the membrane in making batteries. For the purpose of the present invention, a microporous membrane and a separator refer to the same structural elements of a battery.

BACKGROUND OF THE INVENTION

Electrically-powered automotive vehicles, such as automobiles, buses and trucks, are more environmentally friendly since they do not discharge exhaust gases that contribute to air pollution. These vehicles are conventionally powered by a storage battery pack, which supplies the electrical energy for operating the vehicle on the open road, including charging circuitry to enable recharging of the batteries such as by connection to a conventional electrical supply. However, such vehicles are seriously limited in the distance they can travel between battery charges. The lack of batteries having high energy density and long battery life is one of the major factors hindering a more widespread use of electric vehicles. Moreover, rapid growth in the wireless communication market, along with the need for increased mobility and higher power requirement, also require the development of improved battery technologies.

The lithium-ion battery has been the preferred power sources for various applications because of its higher energy density, longer cycle life of charging-discharging and the absence of a "memory" effect problem. In the early 1990's, the first liquid lithium-ion battery "LLB" was commercialized by SONY Corporation and the worldwide market of LLB has grown significantly in the last ten years. In 1997, the LLB emerged as the leader in the portable electronics market capturing a significant market share.

The LLB is produced mainly in a spiral wound configuration in which a separator is sandwiched between positive and negative electrode ribbons. The separator used for LLB is a hydrophobic polyolefin based porous polymer such as polyethylene "PE", polypropylene "PP", and a trilayer PP/PE/PP (U.S. Pat. Nos. 4,620,956; 5,667,911; 5,691,077). The trilayer PP/PE/PP separator developed and produced by Celgard LLC has been commonly used in LLB production for several years.

A polymer lithium-ion battery "PLB" has also been developed for use in portable devices by replacing the liquid electrolyte with a solid polymer or gel polymer electrolyte. Gozdz et al. U.S. Pat. No. 5,418,091, May 23, 1995 and U.S. Pat. No. 5,607,485, Mar. 4, 1997 disclose a plastic battery cell that is made by laminating together a separator between positive and negative electrodes. The separator contains a polymer and a plasticizer, and is substantially devoid of pores. In the process of battery assembly, after lamination at high temperature and pressure, porosity is formed in the separator as well as in the electrodes as a result of extracting the plasticizer with a volatile solvent. As this process requires extraction of the plasticizer, it increases the potential for environmental pollution as well as the cost of making the battery. Moreover, the current collector material for electrodes, such as aluminum foil and copper foil, which have been commonly used for LLB batteries cannot be used for such PLB batteries. The current collect materials of electrodes for the PLB batteries must be in the form of grid or screen of metals such as aluminum grid and copper grid, which increases the cost of production.

Sun, U.S. Pat. No. 5,603,982, Feb. 18,1997 and U.S. Pat. No. 5,69,974, Mar. 11, 1997 disclosed the use of solid polymer electrolyte films which are produced by in-situ polymerization of three monomers, together with a lithium salt and plasticizers in the batteries. The resulting gel polymer electrolyte film is able to adhere to the electrodes of the batteries when applying a vacuum to seal the battery package.

However, as the lithium salts used in Sun is sensitive to moisture, the battery assembly operation has to be performed under anhydrous conditions, for example, in dry box under a nitrogen or an argon or in dry room. This substantially increases the cost of producing these types of batteries.

An improved gel polymer battery has been developed to reduce the cost of production as this type of battery uses the same electrodes as the LLB product, i.e., positive and negative electrode materials coated onto aluminum foil and copper foil respectively, and does not require dry box for battery assembly. A gel polymer lithium-ion battery has been made (Sanyo Corporation) by using same LLB battery electrodes, separator and liquid electrolyte with the further addition of monomers to the liquid electrolyte and subsequently polymerizing the monomers inside the battery case. Although the resulting gel polymer can adhere to the electrodes, the level of adhesion is low and susceptible to separation from the electrodes, and the binding between separator and electrodes could be deteriorated easily during battery operation.

Pendalwar et al., U.S. Pat. No. 5,716,421, Feb. 10, 1998 discloses a gel polymer lithium-ion battery using standard LLB battery electrodes and electrolyte, but replacing the ordinary polyolefin type porous separator such as Celgard® separator (a polyolefin-based microporous membrane) with a multi-layer coated separator which is produced by coating a polymer layer onto the polyolefin separator. However, this coating process reduces the porosity of the separator as the polymer penetrates into and clogs the pores of the porous polyolefin separator. This, in turn, reduces the charging-discharging rate capability of the battery. Moreover, the binding of the gel to the electrodes is weak and the battery can easily be deteriorated, especially for lager sized batteries such as those for use in automotive vehicles.

BRIEF SUMMARY OF THE INVENTION

One aspect of the invention is directed to a microporous membrane comprising (a) a hot-melt adhesive, (b) an engineering plastics, (c) optionally a tackifier and (d) optionally a filler.

In another aspect of the invention, a microporous membrane is made by (a) dissolving hot-melt adhesive, engineering plastics, and optionally a tackifier in an organic solvent, and then adding a pore former and optionally a filler to form a homogeneous slurry, (b) casting the slurry as a film onto a support substrate, (c) evaporating the solvent from the membrane, and (d) washing the resulting microporous membrane with water to form a microporous membrane. A preferred pore former is lithium bromide. The resulting microporous membrane is particularly useful in the construction of a battery, particularly a lithium-ion battery.

The contents of the patents and publications cited herein and the contents of documents cited in these patents and publications are hereby incorporated herein by reference to the extent permitted.

DETAILED DESCRIPTION

Figure 1:
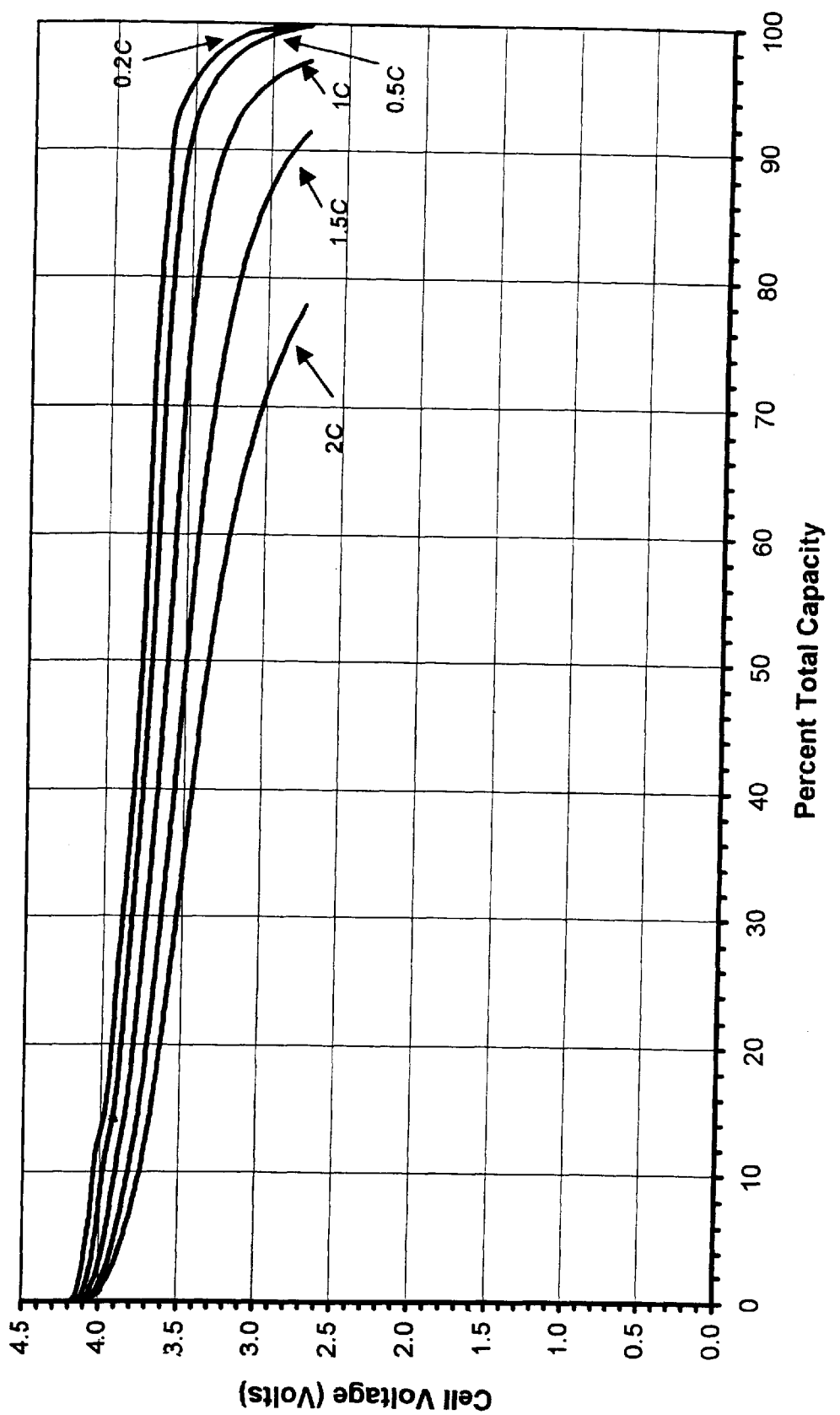
FIG. 1 is a graph of battery voltage versus percent discharge capacity of a 11-$cm^2$ battery using the microporous membrane of example 2 when the battery is discharged at various current levels.

As used herein, "engineering plastics" includes, but is not limited to synthetic thermoplastic polymers, such as condensation polymers, olefinic polymers, and blends thereof disclosed in U.S. Pat. No. 4,247,498, the contents of which is incorporated herein by reference to the extent permitted. "Engineering plastics" also includes any thermoplastic polymers having consistent and reproducible physical properties, which permit their use in the present invention. Preferred polymers include polyimides, polyamide imides, polyether imides, polysulfone, polyether sulfones, polyaryl sulfones, polyether ketones, polyether ether ketones, polyphenylene sulfides, polyarylates and engineered polyamides, e.g., polyamides which have been chemically modified, filled or blended with another polymer to achieve the desired level of physical properties, such as forming a film and being compatible with the hot melt adhesive material. It also includes polybutylene terephthalate, polystyrene, styrene-maleic anhydride, polychlorofluoroethane, polysulfone, polycarbonate, and poly(styrene-methyl methacrylate). For the purpose of the present invention, fiberglass reinforced plastics can also be used.

"Hot-melt adhesive" includes, but is not limited to: poly(ethylene-vinyl acetate) products having weight content of vinyl acetate of from about 25 to about 75%, preferably from about 40 to about 70%, and more preferably from about 40 to about 50%; and poly(ethylene-alkyl acrylate) which has weight content of alkyl acrylate from about 10 to about 30% by weight wherein the alkyl group preferably comprises from one to about five carbon atoms. The hot-melt adhesives also include those disclosed in U.S. Pat. No. 4,487,891 which is incorporated herein by reference to the extent permitted.

In a preferred embodiment, the hot-melt adhesive is present in an amount of from about 2 to about 50% by weight, preferably from about 5 to 30%, and more preferably from about 10 to about 15%.

Preferably, the hot-melt adhesive is selected from poly(ethylene-vinyl acetate) and poly(ethylene-alkyl acrylate), wherein the alkyl group comprises from one to about five carbon atoms, more preferably, the poly(ethylene-vinyl acetate) comprises from about 25 to about 90 weight % of vinyl acetate and from about 10 to about 75 weight % of ethylene.

In a preferred embodiment, the engineering plastic material is present in an amount of from about 20 to about 90% by weight, preferably from about 40 to about 70%, and more preferably from about 50 to about 60%. Preferably, the engineering plastics is selected from the group consisting of polysulfone, polycarbonate, poly(styrene-methyl methacrylate), and combinations thereof; more preferably, the poly(styrene-methyl methacrylate) has a styrene:methyl methacrylate ratio of from about 9:1 to about 1:1; more preferably from about 5:1 to about 1:1.

In a preferred embodiment, the microporous membrane further comprises a tackifier, preferably in an amount from about 0 to about 50% by weight, more preferably from about 2 to about 30%, and the most preferably from about 5 to about 10%. The tackifier is preferably selected from the group consisting of hydrocarbon resin, such as Escorez® 2000 series (aromatic modified aliphatic hydrocarbon resin made by Exxon-Mobile Chemical Company), Escorez® 5000 series (hydrogenated hydrocarbon resins made by Exxon-Mobile Chemical Company), and poly(vinylidene fluoride-hexafluoropropene) "PVdF-HFP" and combinations thereof. The poly(vinylidene fluoride-hexafluoropropene) preferably has a weight content of hexafluropropene in the range of from about 5 to about 12%.

In a preferred embodiment, the microporous membrane further comprises a particulate filler, preferably in an amount of from about 0 to about 50 by weight, more preferably from about 5 to about 30%, and most preferably from about 15 to about 25%. The filler is preferably selected from the group consisting of fumed silica, alumina, titanium dioxide, molecular sieve, calcium carbonate, calcium silicate, glass, ceramic material and polytetrafluoroethylene each in the form of fine powder, and combinations thereof. Preferably the filler has an average particle size of less than about 50 $\mu$m, more preferably less than about 25 $\mu$m, and most preferably less than about 10 $\mu$m.

The microporous membrane preferably has a porosity from about 25 to about 75% and more preferably from about 45 to about 70%. The microporous membrane can be bound onto the surface of the battery electrodes by heat-activation using mild heat and pressure, preferably from about 35 to about 125° C., more preferably from about 40 to about 120° C., and most preferably from about 45 to about 90° C., for a period of time preferably from about 0.01 to about 250 minutes, more preferably from about 1 to about 60 minutes, under a pressure for the heat-activation preferably in the range from about 0.5 to about 100 psi, more preferably from about 1 to about 30 psi. Most preferably, the microporous membrane is adhered to the electrodes upon a combination of heat and pressure according to the above conditions.

Without intending to be bound by any particular theory of operation, it is believed that the engineering plastics provides mechanic strength for the microporous membrane and the hot-melt adhesive serves to bind the microporous membrane to the electrodes after heat-treatment.

"Tackifier" or "tackifying resin" includes, but is not limited to petroleum resins, such as Escorez® 2000 series (aromatic modified aliphatic resins having enhanced compatibility with more polar materials such as poly(ethylene-vinyl acetate), Escorez® 5600 series (hydrogenated aromatic modified cycloaliphatic hydrocarbon resins), Escorez® 5300 series (aliphatic resins) and Escorez® 5400 series (hydrogenated cycloaliphatic hydrocarbon resins) each of the Escorez® resin produced by ExxonMobil Chemical Company, rosin resin, polyterpene resin, any other polymers or copolymers which can enhance the performance of hot-melt adhesives such as poly(vinylidene fluoride-hexafluoropropene) "PVdF-HFP" wherein the weight content of hexafluropropene is in the range of from about 5 to about 12%. Tackifier also includes those disclosed in U.S. Pat. No. 5,414,039, the content of which is incorporated herein by reference to the extent permitted.

As used herein, "filler" and/or "inert filler" includes, but is not limited to silica, alumina, titanium dioxide, molecular sieve, calcium carbonate, calcium silicate, glass, ceramic material, and polytetrafluoroethylene each in the form of fine powder. "Filler" also includes any other materials which prevent the collapse of the micropores of the microporous membrane and enhances the ionic conductivity of the microporous membrane. Some of these materials are disclosed in U.S. Pat. Nos. 6,057,061 and 5,622,792 the contents of which are incorporated herein by reference to the extent permitted.

Without intending to be bound by any particular theory of operation, it is believed that the filler or inert filler prevents the collapse of the micropores of the microporous membrane and also to enhance the ionic conductivity of the said microporous membrane Another aspect of the invention is directed to a method of making a microporous membrane by (a) dissolving hot-melt adhesive, engineering plastics, and optionally a tackifier in an organic solvent, and then adding a pore former and optionally a filler to form a homogeneous slurry, (b) casting the slurry as a film onto a support substrate, (c) evaporating the solvent from the membrane, and (d) washing the resulting microporous membrane with water to form a microporous membrane. The pore former is generally a water-soluble substance, preferably an alkaline metal halide, a granular alkaline metal sulfate, poly(ethylene glycol dimethyl ether) or dimethylformamide "DMF". Mixtures of pore formers can also be used. The alkaline metal halide is preferably lithium bromide.

The term "pore former" includes, but is not limited to alkaline metal salts, such as lithium bromide, other water soluble inorganic salts, such as granular sodium sulfate, water soluble liquid polymer, such as poly(ethylene glycol dimethyl ether) and less volatile and water soluble liquid, such as dimethylformamide "DMF" and dimethylacetate "DMA", as well as water soluble organic compounds in particulate form, such as starch.

"Solvent" includes, but is not limited to a volatile organic solvent, such as cycloaliphatic ether, e.g. tetrahydrofuran "THF"; ketone, e.g. acetone and methyl ethyl ketone "MEK"; linear esters, e.g. ethyl acetate; cyclic esters, e.g. gamma-butylactone; and acetonitrile.

Another advantage of the present invention is that the microporous membrane is hydrophilic and has higher wettability with a polar electrolyte, i.e. lower surface resistance. Consequently a higher conductivity. The membrane has a higher charging-discharging rate capability than the conventional battery comprising separator membrane which is hydrophobic and made of polypropylene "PE", polypropylene "PP", and combination of PE and PP. Moreover, the microporous membrane has higher porosity and larger pore size which can be chemically engineered by selecting different pore former materials having different average particulate ranges and in different proportions. In addition, the microporous membrane can be bound onto electrodes with or without the addition of an adhesive and after heat-activation results in a strong interface between the membrane and electrodes. When the microporous membrane is used in a battery, it offers low and stable impedance during many charging and discharging cycles, longer cycle life, better performance at high temperature, improved safety features.

Without intending to be bound by any particular theory of operation, it is believed that the binding between the microporous membrane and electrodes is a result of physically fusing the hot-melt adhesive, and therefore, it provides a permanent and stronger bond than that provided by the prior art gel polymer electrolyte.

A further aspect of the invention is directed to a battery comprising (1) at least one positive electrode, preferably a lithium-ion positive electrode, (2) at least one negative electrode, preferably a lithium-ion negative electrode, (3) an electrolyte, preferably a lithium-ion electrolyte and more preferably a liquid lithium-ion electrolyte or a polymer lithium-ion electrolyte, and (4) a microporous membrane comprising (a) a hot-melt adhesive, (b) an engineering plastics, (c) optionally a tackifier and (d) optionally a filler.

As used herein, the terms "battery cell" and "cell" are used interchangeably. The term "battery" means either one battery cell or multiple battery cells.

An important utility for the microporous membrane is in the manufacturing of rechargeable lithium-ion batteries, wherein conventional electrode materials can be used to make the positive and the negative electrodes. Preferably, the positive electrode is made with lithiated metal oxide such as lithium cobalt (III) oxide "LiCoO2", lithium nickel oxide "LiNiO$_2$", lithium manganese oxide "LiMn$_2$O$_4$" and combination thereof. The negative electrode is preferably made of carbon in a form such as coke or graphite. However, any electrode materials known in the art can be used herein.

The invention additionally relates to a method of manufacturing the microporous membrane and rechargeable lithium-ion battery. The invention further relates to the use of this microporous membrane in batteries, super capacitors, fuel cells, sensors, electrochromic devices or the like.

The following examples are given as specific illustrations of the invention. It should be understood, however, that the invention is not limited to the specific details set forth in the examples. All parts and percentages in the examples, as well as in the remainder of the specification, are by weight unless otherwise specified.

Further, any range of numbers recited in the specification or paragraphs hereinafter describing or claiming various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. The term "about" when used as a modifier for, or in conjunction with, a variable, is intended to convey that the numbers and ranges disclosed herein are flexible and that practice of the present invention by those skilled in the art using temperatures, concentrations, amounts, contents, carbon numbers, and properties that are outside of the range or different from a single value, will achieve the desired result, namely, a microporous membrane and method for preparing such membrane as well as a battery comprising the membrane.

EXAMPLE 1

A microporous membrane was prepared as follows: 0.90 g of poly(ethylene-vinyl acetate) containing 50 wt. % of vinyl acetate, "PEVA-50", 0.36 g of Escorez® 2596 (aromatic modified aliphatic hydrocarbon resin) made by ExxonMobil Chemical Co. of Houston, Tex., and 4.14 g of polysulfone (Mw. 80,000) made by Scientific Polymer Products Inc. of Ontario, N.Y., "PSU", were dissolved in 40 g of tetrahydrofuran "THF". To this solution, was added 1.00 g of fumed silica. The mixture was stirred overnight. Then, to this slurry, was added 7.00 g of lithium bromide, "LiBr". After the LiBr was dissolved completely, the slurry was cast directly onto 4 inch by 15 inch pieces of Mylar® (polyethylene terephthalate) film substrate at room temperature. The coating thickness was controlled at about 200 μm. Ten pieces of membrane films were made with this slurry. THF evaporated from the membrane at room temperature in about half an hour. The resulting membrane was soaked in water for an hour as soon as THF evaporated completely. Then, the membrane was washed with fresh water thoroughly to obtain a microporous membrane by completely removing the LiBr. Finally, the microporous membrane was allowed to be dried at room temperature. The thickness of the dry microporous membrane was measured to be about 1 mil thick, i.e. 0.001 inch. The microporous membrane films were found to be uniform, homogeneous and mechanically strong. Data relating to this example is summarized in Table 1 as Sample No. 1.

EXAMPLE 2

This example is shown in Table 1, Sample No.2 and was made using the same slurry as described in Example 1 except with a substitution of Escorez® 5690 (cycloaliphatic hydrocarbon resins) made by ExxonMobil Chemical Co. of Houston, Tex., in place of for the Escorez® 2596 (aromatic modified aliphatic resins).

EXAMPLE 3

Sample No. 3 was made using the same slurry mixture as for Example 2 except with a substitution of poly(ethylene/vinyl acetate) containing 70 wt. % of vinyl acetate, "PEVA-70", for PEVA-50.

EXAMPLE 4

In this Example, a microporous membrane was prepared as follows: 0.90 g of poly(ethylene-vinyl acetate) containing 50 wt. % of vinyl acetate, "PEVA-50", 0.36 g of Solef® 20810 (poly(vinylidene fluoride-hexafluoropropene) containing 8% of hexafluoropropene, made by Solvay Advanced Polymer Inc. of Houston, Tex.), and 4.14 g of polysulfone were dissolved in 40 g of tetrahydrofuran "THF". To this solution, was added 1.50 g of fumed silica. The mixture was stirred overnight. Then, to this slurry, was added 7.00 g of lithium bromide "LiBr". After the LiBr dissolved completely, the slurry was cast directly onto 4 inch by 15 inch pieces of Mylar® film substrate at room temperature. The coating thickness was controlled at around 200 μm. The resulting membrane was soaked into water for an hour as soon as THF evaporated completely in about half an hour. Then, the membrane was washed with fresh water thoroughly to obtain a microporous membrane. Finally, the microporous membrane was dried at room temperature. The thickness of the dried microporous membrane was measured to be 1.2 mil thick, i.e. 0.0012 inch. The microporous membrane films were found to be uniform, homogeneous and mechanically strong. Data relating to this example is summarized in Table 1 as Sample No. 4. Additional data such as pore size and porosity content for this Sample No.4 are recorded in Table 2.

EXAMPLES 5–11

As summarized in Table 1, these seven samples, identified as Sample Nos. 5 through 11, were microporous membranes made with the same slurry described in Example 4 except the ingredients were present in different concentrations. Sample No. 6 was made without the use of inert filler, while Sample No. 9 was made without the use of tackifier.

EXAMPLES 12–13

In Table 1, Sample No. 12 and 13 are microporous membrane films made with the same slurry mixture as described in Example 4 except for Sample 12 with a substitution of alumina (average particle size less than about 10 μm) made by Sigma-Aldrich Inc of Milwaukee, Wis., for silica, while for Sample No. 13, with a substitution of molecular sieve (average particle size less than about 10 μm) made also by Sigma-Aldrich Inc. for silica and in the absence of tackifying resin.

EXAMPLE 14

In this example, microporous membrane Sample No. 14 was made with the same slurry described in Example 4 except with a substitution of PEVA-40 for PEVA-50, a second substitution of Solef® 21216 (poly(vinylidene fluoride-hexafluoropropene) containing 12% of hexafluoropropene) for Solef® 20810, and a third substitution of poly(bisphenol-A carbonate) "PBAC", for polysulfone.

EXAMPLE 15

In Table 1, Sample No. 15 is a microporous membrane made with the same slurry described in Example 14 except with a substitution of dimethylformamide "DMF" for LiBr and with the use of PEVA-40 in different concentration, but without the use of inert filler.

EXAMPLE 16

In this example, microporous membrane Sample No. 16 was made with the same slurry described in Example 14 except with a substitution of poly(methyl methacrylate), "PMMA", for PBAC and with substitution of methyl ethyl ketone "MEK" for THF, and in the absence of tackifying resin. The microporous membrane obtained was found to be brittle and had reduced strength.

EXAMPLE 17

In this instance, microporous membrane Sample No. 17 was made with the same slurry described in Example 14 except a substitution of poly(styrene-methyl methacrylate) in ratio of 70:30, "PSMMA", for polysulfone.

EXAMPLE 18

This microporous membrane Sample No. 18 was made with the same slurry described in Example 4 except a substitution of RTP #905 which is a polysufone resin containing 30% glass fiber for reinforcement made by RTP Company of Winova, Minn., for pure polysulfone. Data relating to this sample are recorded in Table 1 and 2.

TABLE 1

| Sample No. | Microporous membrane composition and proportions (g) | | | | | | Resulting microporous membrane |
|---|---|---|---|---|---|---|---|
| | Hot-melt adhesive | Tackifier | Eng. Plastic | Inert filler | Solvent (g) | Pore former (g) | |
| 1 | PEVA-50 0.90 | Escorez ® 2596 0.36 | PSU 4.14 | Silica 1.00 | THF 40 | LiBr 7.00 | uniform |
| 2 | PEVA-50 0.90 | Escorez ® 5690 0.36 | PSU 4.14 | Silica 1.00 | THF 40 | LiBr 7.00 | uniform |
| 3 | PEVA-70 0.90 | Escorez ® 5690 0.36 | PSU 4.14 | Silica 1.00 | THF 40 | LiBr 7.00 | uniform |
| 4 | PEVA-50 0.90 | Solef ® 20810 0.36 | PSU 4.14 | Silica 1.50 | THF 40 | LiBr 7.00 | uniform |
| 5 | PEVA-50 0.90 | Solef ® 20810 0.54 | PSU 3.96 | Silica 1.00 | THF 40 | LiBr 7.00 | uniform |
| 6 | PEVA-50 0.90 | Solef ® 20810 0.54 | PSU 3.96 | (None) | THF 40 | LiBr 7.00 | PEVA distributed unevenly |
| 7 | PEVA-50 0.90 | Solef ® 20810 0.54 | PSU 3.96 | Silica 1.50 | THF 40 | LiBr 7.00 | uniform |
| 8 | PEVA-50 0.90 | Solef ® 20810 0.36 | PSU 4.14 | Silica 1.00 | THF 40 | LiBr 7.00 | uniform |
| 9 | PEVA-50 0.90 | (None) | PSU 4.50 | Silica 1.00 | THF 40 | LiBr 7.00 | PEVA distributed unevenly |
| 10 | PEVA-50 0.90 | Solef ® 20810 0.36 | PSU 4.14 | Silica 1.S0 | THF 40 | $Na_2SO_4$ 7.00 | not uniform |
| 11 | PEVA-50 0.90 | Solef ® 20810 0.36 | PSU 4.14 | Silica 1.50 | THF 40 | PEGDE-250 7.00 | uniform |
| 12 | PEVA-50 0.90 | Solef ® 20810 0.36 | PSU 4.14 | Alumina 1.00 | THF 40 | LiBr 7.00 | uniform |
| 13 | PEVA-50 0.63 | (None) | PSU 4.05 | M. Sieve 1.00 | THF 40 | LiBr 7.00 | uniform |
| 14 | PEVA-40 0.63 | Solef ® 21216 2.50 | PBAC 1.00 | Silica 1.00 | THF 40 | LiBr 5.00 | uniform |
| 15 | PEVA-40 1.00 | Solef ® 21216 2.50 | PBAC 2.00 | (None) | THF 40 | DMF 5.00 | uniform |
| 16 | PEVA-40 0.63 | (None) | PMMA 2.50 | Silica 2.00 | MEK 40 | LiBr 5.00 | brittle, reduced strength |
| 17 | PEVA-40 0.63 | Solef ® 21216 0.45 | PSMMA 4.05 | Silica 1.00 | THF 40 | LiBr 5.00 | uniform |
| 18 | PEVA-50 0.90 | Solef ® 20810 0.36 | RTP #905 4.14 | Silica 1.00 | THF 40 | LiBr 7.00 | uniform |

In Table 1, the abbreviations are as follows: PEVA-50, poly(ethylene-vinyl acetate) containing 50 wt. % of vinyl acetate; PEVA-40, poly(ethylene-vinyl acetate) containing 40 wt. % of vinyl acetate; PEVA-70, poly(ethylene-vinyl acetate) containing 70 wt. % of vinyl acetate; PSU, polysulfone; PBAC, poly(bisphenol-A carbonate); PMMA, poly(methyl methacrylate); PSMMA, poly(styrene-methyl methacrylate); M. Sieve, molecular sieve; THF, tetrahydrofuran; MEK, methyl ethyl ketone; PEGDE-250, poly(ethylene glycol dimethyl ether) with molecular weight of 250; DMF, dimethylformamide.

EXAMPLE 19

Characterization of the Microporous Membrane

Some of the microporous membrane samples made as described above were subjected to characterization including thickness, basis weight, mean of pore size, and porosity. Data relating to Sample Nos. 4, 8, 11, 12 are set forth in Table 2. The commercial product Celgard® 2300 were also tested as a control and are set forth in the same table.

The medium value of pore size of microporous membranes as recorded in Table 2 was determined by porometry. Each of these four samples have much higher porosity than Celgard® 2300. It is believed that higher porosity of the microporous membrane can result in higher charging-discharging rate capability of battery.

TABLE 2

| Sample No. | Thickness (inch) | Basis Weight (g/m$^2$) | Pore Size ($\mu$m) | % Porosity |
|---|---|---|---|---|
| 4 | 0.0012 | 13.36 | 0.43 | 69.6 |
| 8 | 0.0012 | 16.46 | 0.57 | 61.0 |
| 11 | 0.0009 | 15.16 | 0.44 | 54.0 |
| 12 | 0.0011 | 16.33 | 0.56 | 64.8 |
| Celgard ® 2300 | 0.0010 | 13.85 | 0.46 | 39.9 |

The microporous membrane is different from the hydrophobic polyolefin type separator in at least the following respects: a) improved hydrophilicity, i.e. good wettability with a polar electrolyte resulting in a lower surface resistance; b) improved microporous quality; c) the pore size as well as porosity of the microporous membrane can be chemically engineered; c) the membrane is heat activatable having improved electrode contact and adhesion.

EXAMPLE 20

Preparation of Batteries

A lithium-ion rechargeable battery was assembled using a carbon negative electrode, a LiCoO$_2$ positive electrode, and a membrane of Sample No. 2. Both negative and positive electrodes were conventional liquid lithium-ion battery electrodes, namely negative electrode containing about 90% active carbon material, and the positive electrode containing about 91% active LiCoO$_2$.

A microporous membrane of Sample No. 2 with a dimension of 38 mm by 45 mm was sandwiched between a positive electrode 30 mm by 38 mm and a negative electrode 32 mm by 40 mm, i.e. the battery having a total active area of 11 cm$^2$. The battery was packaged and partially sealed in an aluminum foil-laminated plastic bag. After the battery was fully dried, it was transferred into a dry-box under nitrogen and having less than 1 ppm moisture. About 0.4 g of 1.2M electrolyte was injected into the battery, wherein the electrolyte was prepared by dissolving LiPF$_6$ salt produced by Stella Chemifa Corp. of Osaka, Japan, into a solution of ethylene carbonate/diethyl carbonate/dimethyl carbonate 2:1:1. The battery was completely sealed, and then was heated at a temperature of 85° C. for 30 minutes and then was pressed at a pressure of 5 psi to bind the microporous membrane to the positive and the negative electrodes. After cooling the battery down to room temperature, the battery was subjected to charge and discharge testing.

FIG. 1 shows voltage versus capacity when discharged at various current levels for this battery cell. The discharge current rate was 0.2 C, 0.5 C, 1 C, 1.5 C and 2 C respectively, i.e. the current density for discharge was 0.6, 1.5, 3.0, 4.5, and 6 mA/cm$^2$ respectively. Performance data relating to this battery cell is summarized in Table 3 as Battery No. 1.

At the end of performance test, the battery was disassembled and the microporous membrane used for the battery was found to be firmly bound onto the positive and negative electrodes.

A second battery was assembled using a piece of microporous membrane Sample No. 18 in the same manner as described above for Battery No. 1. Testing data of the resulting battery are recorded in Table 3 as Battery No. 2.

For comparison, a third battery was made in the same way as described above for Battery No. 1 except with a substitution of conventional separator Celgard® 2300 for microporous membrane Sample No. 2 as Battery No. 3 (control battery). For charge and discharge performance test, the control battery was held between two plates to assure the proper contact between separator and electrodes because the Celgard® separator is unable to be bound to electrodes even through heat activation/treatment. Testing data on the control battery are also recorded in Table 3 as Battery No. 3.

Figure 2:
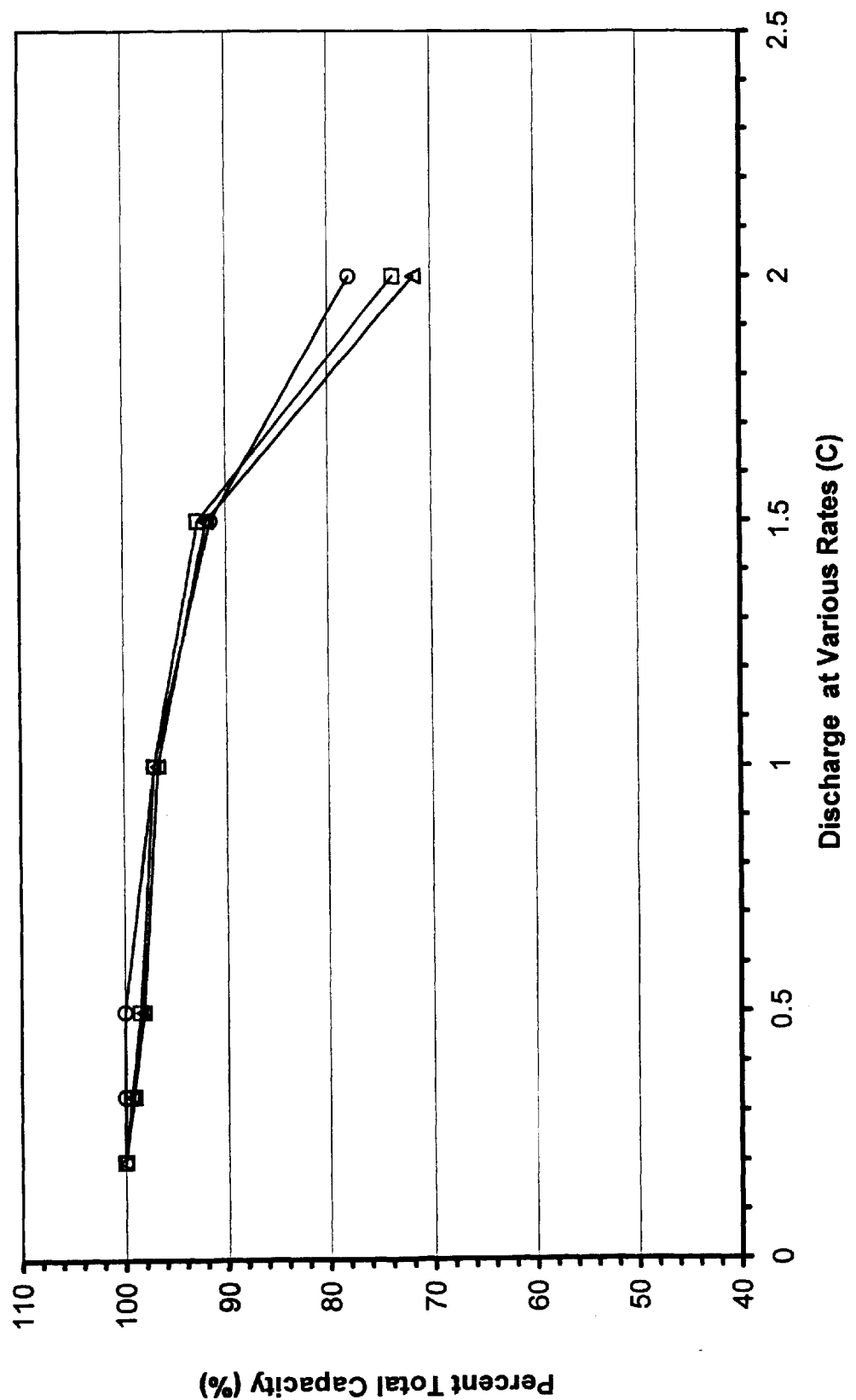
FIG. 2 is a graph showing the percent total discharge capacity when various battery cells are discharged at various current rate levels for two 11 cm$^2$ battery cells using the microporous membranes in example 2 (circle) and example 18 (square), respectively and a 11 cm$^2$ LLB battery using a commercially available separator, Celgard® 2300, (triangle) for comparison.

The discharge-recharge cycle performance results of these three batteries are also shown in FIG. 2. The figure shows percent total discharge capacity when the batteries are discharged at various current rate levels for batteries No. 1 (circle) and 2 (square), and also Battery No. 3 (triangle) for comparison. Both batteries Nos. 1 and 2 offered higher discharging rate capability than the control battery.

TABLE 3

| Battery No. | Microporous membrane | Rate capability at 1C rate (%) | Rate capability at 2C rate (%) |
|---|---|---|---|
| Battery No. 1 | 2 | 97.1 | 77.9 |
| Battery No. 2 | 18 | 97.1 | 73.6 |
| Battery No. 3 | Celgard ® 2300 | 96.7 | 71.6 |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

What is claimed is:

1. A microporous membrane having at least one layer which comprises (a) a hot-melt adhesive, (b) an engineering plastics, (c) a tackifier and (d) a filler; wherein the engineering plastics is present in an amount of from about 20 to about 90% by weight.

2. The microporous membrane of claim 1, wherein the membrane can be bound to battery electrodes by heat-activation at a temperature of from about 35 to about 125° C. and under a pressure of from about 0.5 to about 100 psi.

3. The microporous membrane of claim 1, wherein the microporous membrane has a porosity from about 25 to about 75%.

4. The microporous membrane of claim 1, wherein the membrane has a porosity of from about 45 to about 70%.

5. The microporous membrane of claim 1, wherein the hot-melt adhesive is poly(ethylene-vinyl acetate) or poly(ethylene-alkyl acrylate).

6. A microporous membrane having at least one layer which comprises (a) a hot-melt adhesive, (b) an engineering plastics, (c) a tackifier and (d) a filler; wherein the hot-melt adhesive is poly(ethylene-vinyl acetate) or poly(ethylene-alkyl acrylate); wherein said alkyl group comprises from one to about five carbon atoms.

7. A microporous membrane having at least one layer which comprises (a) a hot-melt adhesive, (b) an engineering plastics, (c) a tackifier and (d) a filler; wherein the engineering plastics is selected from the group consisting of polysulfone, polycarbonate, poly(styrene-methyl methacrylate), and combinations thereof.

8. A microporous membrane comprising (a) a hot-melt adhesive, (b) an engineering plastics, (c) a tackifier and (d) a filler; wherein the engineering plastics is selected from the group consisting of polysulfone, polycarbonate poly (styrene-methyl methacrylate), and combinations thereof.

9. The microporous membrane of claim 8, wherein the poly(styrene-methyl methacrylate) comprises a styrene:methyl methacrylate ratio of from about 9:1 to about 1:1.

10. The microporous membrane of claim 1, wherein the tackifier is selected from the group consisting of aromatic modified aliphatic hydrocarbon resins, aliphatic resins, hydrogenated cycloaliphatic hydrocarbon resins, rosin resin, polyterpene resin, PVdF-HFP, and combinations thereof.

11. The microporous membrane of claim 10, wherein the content of hexafluoropropene in PVdF-HFP is from about 5 to about 12%.

12. The microporous membrane of claim 1, wherein the filler is selected from the group consisting of fumed silica, alumina, titanium dioxide, molecular sieve, calcium carbonate, calcium silicate, glass, ceramic material and polytetrafluoroethylene and combinations thereof.

13. The microporous membrane of claim 12, wherein the filler is in the form of powder having an average particle size of less than about 25 µm.

14. The microporous membrane of claim 13, wherein the filler has an average particle size of less than about 10 µm.

15. The microporous membrane of claim 1, wherein the hot-melt adhesive is present in an amount of from about 2 to about 50% by weight.

16. The microporous membrane of claim 1, wherein the tackifier is present in an amount of from about 2 to about 30% by weight.

17. The microporous membrane of claim 1, wherein the filler is present in an amount of from about 5 to about 30% by weight.

18. A microporous membrane comprising (a) a poly (ethylene-vinyl acetate) or a poly(ethylene-alkyl acrylate), wherein said alkyl group comprises from one to about five carbon atoms, (b) a polysulfone, a polycarbonate, a poly (styrene-methyl methacrylate) or a combinations thereof, (c) a tackifier and (d) a silica.

19. The microporous membrane of claim 18, wherein the poly(ethylene-vinyl acetate) or the poly(ethylene-alkyl acrylate) is present in an amount of from about 10 to 15% of the membrane by weight, wherein the polysulfone, the polycarbonate, the poly(styrene-methyl methacrylate) or the combinations thereof is present in an amount of from about 50 to about 60%, wherein the tackifier is present in an amount of from about 5 to about 10%, and wherein the silica is present in an amount from about 15 to about 25%.

* * * * *

UNITED STATES PATENT AND TRADEMARK OFFICE
CERTIFICATE OF CORRECTION

PATENT NO.   : 6,527,955 B1
DATED        : March 4, 2003
INVENTOR(S)  : Luying Sun It is certified that error appears in the above-identified patent and that said Letters Patent is hereby corrected as shown below:

Column 12,
Lines 59-64, claim 7 should read as follows:
-- The microporous membrane of Claim 5, wherein the poly(ethylene-vinyl acetate) has from about 25 to 90 weight % of vinyl acetate and from about 10 to about 75 weight % of ethylene. --

Signed and Sealed this

Second Day of December, 2003

JAMES E. ROGAN
*Director of the United States Patent and Trademark Office*